(12) United States Patent
Caballero Atienzar

(10) Patent No.: US 10,907,603 B2
(45) Date of Patent: Feb. 2, 2021

(54) DEVICE AND METHOD FOR MANAGING THE CHARGING AND DISCHARGING OF ULTRACAPACITORS WITHOUT CONTROL WIRING

(71) Applicant: GESTIMA SOLAR S. L., Albacete (ES)

(72) Inventor: Manuel Alonso Caballero Atienzar, Albacete (ES)

( * ) Notice: Subject to any disclaimer, the term of this patent is extended or adjusted under 35 U.S.C. 154(b) by 45 days.

(21) Appl. No.: 15/551,110

(22) PCT Filed: Feb. 26, 2015

(86) PCT No.: PCT/ES2015/070135
§ 371 (c)(1),
(2) Date: Aug. 15, 2017

(87) PCT Pub. No.: WO2016/135352
PCT Pub. Date: Sep. 1, 2016

(65) Prior Publication Data
US 2018/0030945 A1    Feb. 1, 2018

(51) Int. Cl.
*F02N 11/08*    (2006.01)
*H02J 7/34*    (2006.01)
(Continued)

(52) U.S. Cl.
CPC .......... *F02N 11/0862* (2013.01); *F02N 11/08* (2013.01); *F02N 11/14* (2013.01);
(Continued)

(58) Field of Classification Search
CPC .. F02N 11/0862; F02N 11/0866; F02N 11/14; F02N 11/0825; F02N 11/87; F02N 2011/0874–0888; F02N 2200/061; F02N 2200/062; F02N 2200/063; F02N 2200/064; F02N 2250/00; F02N 2250/02; H02J 7/34; H02J 7/345
(Continued)

(56) References Cited

U.S. PATENT DOCUMENTS 7,319,306 B1 * 1/2008 Rydman .............. F02N 11/0866
320/166
7,806,095 B2 * 10/2010 Cook .................. F02N 11/0866
123/179.3
(Continued)

*Primary Examiner* — Logan M Kraft
*Assistant Examiner* — Robert A Werner
(74) *Attorney, Agent, or Firm* — Porzio Bromberg & Newman P.C.

(57) ABSTRACT

The invention relates to a method and device for managing the charging and discharging of ultracapacitors without control wiring, connected in parallel to the electrical system of a combustion engine, or any other device or process that needs a battery to supply or absorb strong electrical currents. The device is advantageous in that, for the operation thereof, it is not necessary to modify the electrical wiring of the engine and it allows the operation of the engine even when the battery is partially charged, completely discharged, or when there is no battery. The invention relates to a portable embodiment, an embodiment for permanent use and another embodiment in which the device is connected to an electrochemical battery forming an assembly, which is used to supply the engine with electrical energy.

7 Claims, 2 Drawing Sheets

(51) Int. Cl.
*F02N 11/14* (2006.01)
*H02J 7/00* (2006.01)

(52) U.S. Cl.
CPC .............. *H02J 7/0068* (2013.01); *H02J 7/34* (2013.01); *F02N 2200/122* (2013.01); *H02J 7/345* (2013.01); *Y02T 10/70* (2013.01)

(58) Field of Classification Search
USPC ........ 123/179.3; 701/112; 73/114.58, 114.59
See application file for complete search history.

(56) References Cited

U.S. PATENT DOCUMENTS

| | | | | |
|---|---|---|---|---|
| 2008/0276892 | A1* | 11/2008 | Doljack | F02N 11/0866 |
| | | | | 123/179.28 |
| 2009/0261787 | A1* | 10/2009 | Cegnar | H01M 10/4264 |
| | | | | 320/166 |
| 2009/0322101 | A1* | 12/2009 | Reynolds | F02N 11/0866 |
| | | | | 290/38 R |
| 2011/0100735 | A1* | 5/2011 | Flett | B60L 50/61 |
| | | | | 180/65.22 |
| 2016/0049819 | A1* | 2/2016 | Butler | H02J 7/0054 |
| | | | | 320/105 |
| 2016/0068068 | A1* | 3/2016 | Stemmler | B60L 50/61 |
| | | | | 307/10.1 |
| 2016/0146173 | A1* | 5/2016 | Mars | B60K 6/28 |
| | | | | 701/113 |
| 2016/0327007 | A1* | 11/2016 | Averbukh | F02N 11/10 |

* cited by examiner

DEVICE AND METHOD FOR MANAGING THE CHARGING AND DISCHARGING OF ULTRACAPACITORS WITHOUT CONTROL WIRING

CROSS REFERENCE TO RELATED APPLICATIONS

This application is a section 371 National Stage Application of International Application No. PCT/ES2015/070135, filed on Feb. 26, 2015 and published as WO 2016/135352 A1 on Sep. 1, 2016. The contents of said application are hereby incorporated by reference in their entirety.

OBJECT OF THE INVENTION

The object of the present invention is a device and its control procedure that manages the charging and discharging of a group of ultracapacitors and allows their connection, preferably, to the electrical system of a combustion engine to ensure its start-up and operation, regardless of the status of the electrochemical battery. The main differentiating feature of the invention is that to perform such management no external commands are required, indirectly detecting start or stop attempts, the operational status of the internal combustion engine and the status of the electrochemical battery of the combustion engine, thus meaning that it is not necessary to modify the electrical wiring or installation of the combustion engine, but only to connect the device in parallel to the power wiring, for example, to the electrical battery terminals.

BACKGROUND OF THE INVENTION

According to data from the Mutua Madrileña insurance company, the assembly formed by the vehicle's electrical system and battery is the second main reason for roadside technical assistance requests, making up 30% of calls. Interestingly, according to the assistance services provided by EuropAssistance, the ignition system represents the most common fault, making up more than one million assistance calls per year, all this without counting the countless cases of breakdowns where no kind of insurance was used.

This is a very frequent and unpredictable breakdown, entailing more or less significant consequences, including loss of time, loss of merchandise or travel tickets and which normally involves the stoppage of the vehicle and/or requires assistance.

To assist in such breakdowns a "booster" or portable starter is used that contains a small electrochemical battery that must be fully charged at the time of its use, meaning that the device must remain plugged to the mains to ensure its operation when necessary. Furthermore, once the engine is started by this method, if the vehicle battery is severely damaged the engine's continued performance cannot be guaranteed and neither can subsequent ignition attempts.

On the other hand, the use of ultracapacitor batteries as an auxiliary storage system to support the ignition of internal combustion engines is commonplace in the state of the art. These auxiliary ultracapacitor batteries are preferably used to assist the ignition of large internal combustion engines and devices that require an electrochemical battery that must operate under conditions of low temperatures or very frequent start-stop cycles, since they present the following advantages:

Their low internal resistance allows them to deliver the high currents required to activate the starter motors of combustion engines with very low losses.

Their nominal characteristics barely vary between −40 to 65° C., which is especially interesting at low temperatures, whereas electrochemical batteries show dramatically decreased performance.

When they work together with an electrochemical battery they, greatly prolong the life of that battery to avoid the intense discharges to which they are subjected upon ignition.

There are different devices in the current state of the art that allow such ultracapacitor batteries to be connected to the electrical system of a combustion engine, but they necessarily entail the modification of the control system and/or power wiring in order to work, thus entailing in the case of vehicles, for example, the intervention of an expert and the need for the approval of the modifications carried out as well as preventing their use as emergency equipment whenever necessary.

There are also portable ultracapacitor batteries, which are connected in, a whenever necessary to the electrochemical battery and assist the starter when the vehicle battery is discharged. In the known cases, the operations of connection, charging, discharging, activation, disconnection, etc., are performed in a completely manual, rudimentary and dangerous manner.

It would therefore be desirable to have a device that allowed the connection, management and control of a group of ultracapacitors as a support system to the main battery, without having to modify the electrical wiring of the internal combustion engine and without needing to be charged beforehand.

For this purpose, the present invention focuses on the procedure and the control elements for charging and discharging a group of ultracapacitors, that, without needing external orders, indirectly detects ignition and shutdown attempts, the operational status of the internal combustion engine or process and the status of the battery system. This is achieved through the use of a control algorithm based on reading variations in voltage, current and internal resistance of the electrical system of the internal combustion engine, and other physical parameters necessary for the proper management, such as temperature.

DESCRIPTION OF THE INVENTION

The device for managing the charging and discharging of an ultracapacitor battery without control wiring, object of the present invention comprises:

An ultracapacitor battery (1) formed by one or more ultracapacitors.

A first electrical connection in parallel with the electrical system of the combustion engine, this electrical connection is at-will and removable.

A second removable electrical connection to an external power source (14).

A first one-way switch (2) that controls the flow of electricity from the electrical system of the combustion engine towards the ultracapacitor battery (1), A second one-way switch (3) that controls the flow of electricity from the ultracapacitor battery (1) into the electrical system of the combustion engine.

A DC-to-DC converter (4) to convert voltage up or down suitable for charging the ultracapacitor battery (1) from the engine's electrical system and from the external power source (14).

A first electronic device (5) that prevents the flow of electricity from the external power source (14) into the electrical system of the combustion engine.

A second electronic device (6) that prevents the flow of electricity from the electrical system of the combustion engine towards the external power source (14).

One or more sensors (9) for measuring the voltage of the electrical system of the internal combustion engine arranged in the first electrical connection.

One or more sensors for measuring the intensity of the current flowing between the electrical system of the engine and the ultracapacitor battery (1) arranged in the first electrical connection.

One or more voltage sensors (8) of the ultracapacitor battery.

One or more current intensity sensors for ultracapacitor battery.

An ambient temperature sensor (16),

A device to select the maximum ultracapacitor charging voltage.

A human-machine interface (15) appropriate for:
communicating with the electronic control device and allowing the programming of the parameters Vnom, Vmax, Vmin, and dVbat.
displaying information on the operating parameters of the ignition
and auxiliary power devices of the electrical system of the internal combustion engine and for operating said ignition and auxiliary power device.

An electronic control device (7) and its corresponding firmware appropriate for:
Receiving and processing the signals measured by the current voltage and intensity sensors (8 and 9) and the current of the electrical system of the combustion engine and the ultracapacitors.
Receiving and processing the signal captured by the temperature probe (16), for the modification of the parameters Vnom, Vmax, Vmin and dVbat according to the ambient temperature and the characteristics of the electric battery (10) of the combustion engine;
Controlling the opening and closing of the first (2) and second (3) one-way switches.
Control the pulse width of the second one-way switch (3).
Controlling the operation of the Dc-to-DC converter (4).
Communicating with the human-machine interface (15).

And the management procedure for charging and discharging the ultracapacitors without control wiring using the device described above comprises the following stages:

a. Parallel connection to the electrical system of a combustion engine.
b. Selection of maximum voltage, Vmax, and nominal voltage, Vnom, of the electrical system of the combustion engine.
c. Detection of the voltage of the battery, Vbat, of the combustion engine.
d. If Vbat≥Vmin, the electronic control device (7) activates the DC-to-DC converter (4) allowing the electric battery of the engine (10) to charge the ultracapacitor battery (1) up to Vmax.
e. if Vbat<Vmin, the human-machine internee (15) requires the connection of the ignition and auxiliary operation device to an external electric power source or the rechargeable electric battery (14), and the electronic device control (7) activates the DC-to-DC converter (4) allowing the external source (14) or the rechargeable electric battery to charge the ultracapacitor battery (1) up to Vmax.
f. Electrical closing of the starter motor circuit.
g. Detection of the electrical closing of the starter motor through the measurement of the sudden change in voltage, dVbat, of the electrical system of the combustion engine.
h. If dVbat is greater than a predetermined value and the electric starter motor has been electrically closed, the ultracapacitor battery powers the electric circuit of the combustion engine.
i. Detection of the operating status of the combustion engine by measuring the voltage, Vbat, of its electrical system.
j. If Vbat=Vmax, the internal combustion engine has started and has activated the charging alternator and electronic control device (7) proceeds to regulate the charge intensity of the battery of ultracapacitors (1) through the pulse width modulation of the first one-way switch (2).
k. Stopping the combustion engine.
l. If Vbat is less than or equal to Vnom, the motor is stopped, disengaging the alternator (11) and electronic control device (7) opens the first (2) and (3) second unidirectional switches and the ultracapacitor battery (I) charges up to Vmax using the DC-to-DC converter (4) with the power supplied by the electric battery of the combustion engine (10) or the external power source (14).

DESCRIPTION FIGURES

Figure 1:
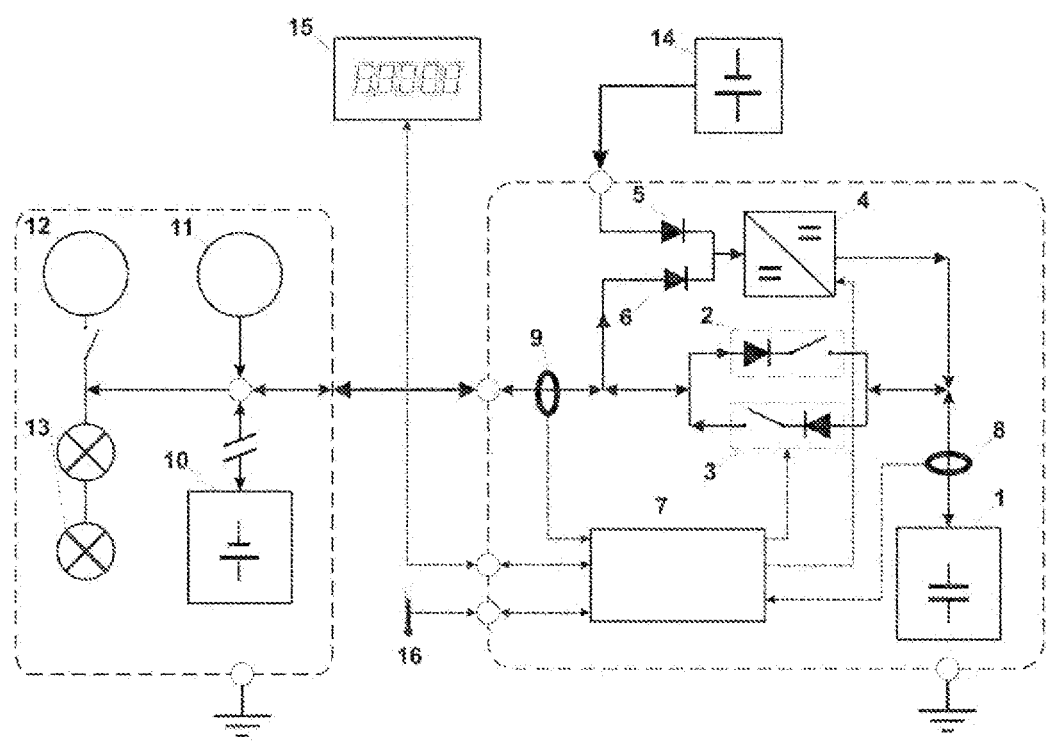
FIG. 1 shows a wiring diagram of the auxiliary ignition and operation device.
Figure 2:
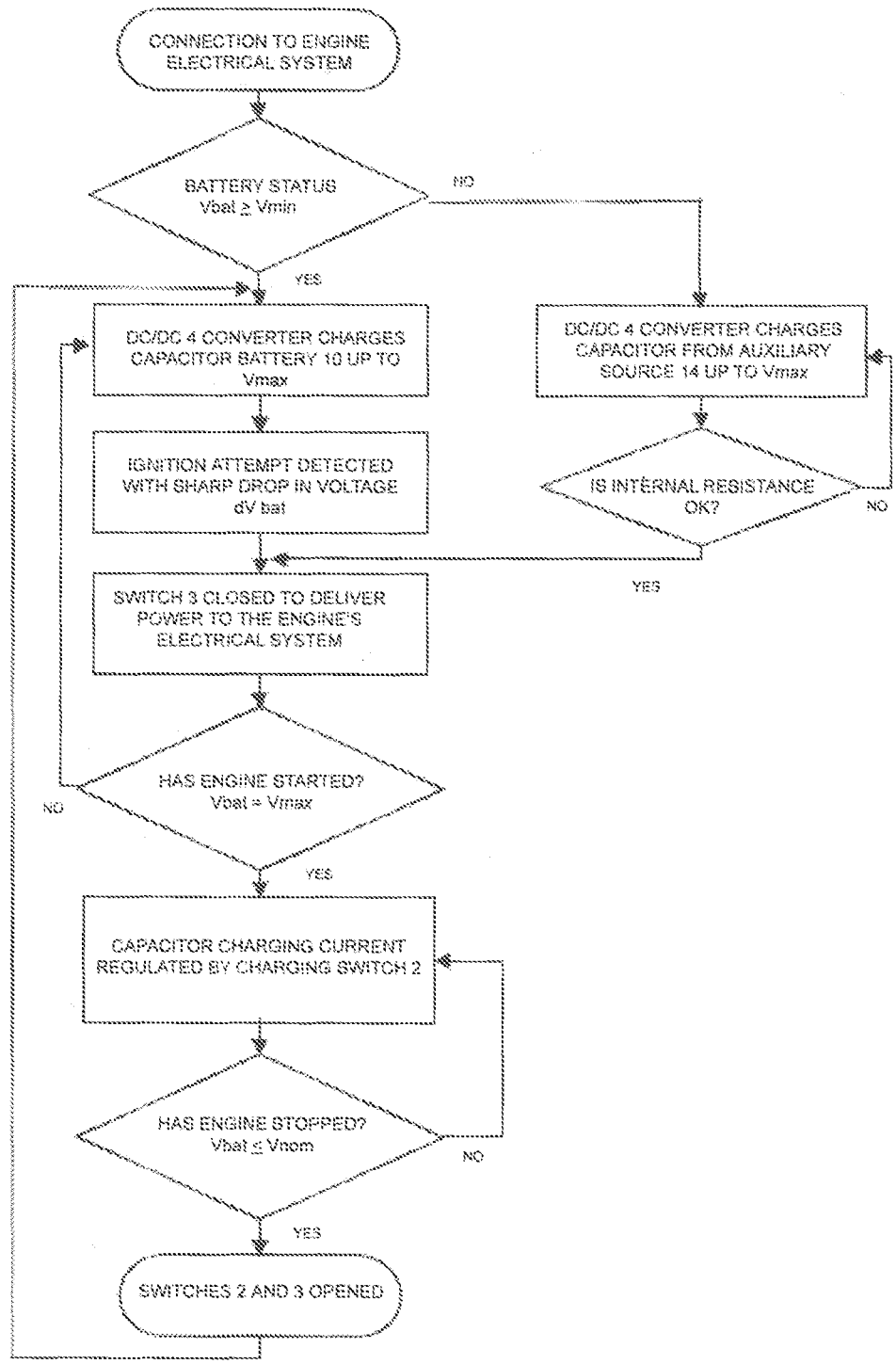
FIG. 2 shows a wiring diagram of the auxiliary ignition and operation procedure.

The following references are used in the figures:
1. Ultracapacitor battery
2. First one-way switch
3. Second one-way switch
4. DC-to-DC converter
5 and 6. Electronic devices
7. Electronic control device
8 and 9. Current voltage and intensity
10, electric battery of the internal-combustion engine
11. Alternator
12. Starter motor
13. Auxiliary consumption
14. External electric power source
15. Human-machine interface
16 Temperature probe

PREFERRED EMBODIMENT OF THE INVENTION

The main function of the invention to which this report refers is to ensure, the ignition and running of an internal combustion engine, or any device or process that need an electrochemical battery to deliver or absorb strong currents in a short period of time, whatever the status of its battery or even in absence or total failure thereof. This is achieved through the management of the charging and discharging of a group of ultracapacitors used as fast storage system power.

The main distinguishing feature of the invention consists in performing this management without requiring any external control instructions, indirectly detecting attempts at ignition and shutdown, the running status of the internal combustion engine and the status of the battery of the engine. This is achieved through the use of a control algorithm based on reading variations in voltage, current and internal resistance of the electrical system of the internal combustion engine, and other physical parameters necessary for the proper management, such as temperature.

In its preferred embodiment, the device object of this invention comprises:

A group of ultracapacitors (1) with a capacity adapted to the power of the starter motor (12) of the internal combustion engine and the auxiliary consumption circuits (13).

A first electrical connection in parallel with the electrical system of the internal combustion engine, this electrical connection is at-will and removable.

A second removable electrical connection to an external power source.

A first one-way switch (2) that controls the flow of power from the electrical system of the engine, in particular from the battery or the alternator, according to the phase of operation, to the ultracapacitor battery.

A second one-way switch (3) that controls the flow of electrical energy from the ultracapacitor battery to the electrical system of the combustion engine.

A DC-to-DC converter (4) to convert voltage up or down that charges the ultracapacitor battery from the engine's electrical system and from the external power source.

A first and a second electronic device (5 and 6), preferably diodes, that prevent the passage of electricity from the external power source (14) to the battery (10) and vice versa.

One or more sensors (9) for measuring the voltage of the electrical system of the internal combustion engine affixed to the first electrical connection.

One or more sensors (9) for measuring the current intensity of the electrical system of the internal combustion engine affixed to the first electrical connection.

One or more sensors (S) for measuring the voltage of the ultracapacitor battery.

One or more sensors (9) for measuring the current intensity of the ultracapacitor battery.

A sensor (16) for measuring the ambient temperature.

A human-machine interface (15) incorporated in the device or externally connected that is suitable for:
communicating with the electronic control device (7) and allowing the programming of the parameters Vnom, Vmax, Vmin, and dVbat.
displaying information on the operating parameters of the ignition and auxiliary power devices of the electrical system of the internal combustion engine and for operating said ignition and auxiliary power device.

An electronic control device (7) and its corresponding firmware appropriate for:
Receiving and processing the signals measured by the current voltage and intensity sensors of the electrical system of the combustion engine and the ultracapacitors (8 and 9).
Receiving and processing the signal captured by the temperature probe (16), and modifying the parameters Vnom, Vmax, Vmin and dVbat according to the ambient temperature measured and the characteristics of the electric battery (1) of the combustion engine.

Controlling the opening and closing of the first (2) and second (3) one-way switches.

Control the pulse width of the second one-way switch (3).

Controlling the operation of the DC-to-DC converter (4).

Communicating with the human-machine interface (15).

And the method for operating the device described above comprises the following steps:

a. Parallel connection to the electrical wiring of the combustion engine.

b. Selection of maximum voltage, Vmax, and nominal voltage, Vnom, of the electrical system of the combustion engine.

c. Detection of the voltage of the battery, Vbat of the combustion engine's battery.

d. if Vbat≥Vmin, (where Vmin is the minimum operating voltage of the DC-to-DC converter) the electronic control device (7) activates the DC-to-DC converter (4) allowing the electric battery of the engine (10) to charge the ultracapacitor battery (1) up to Vmax.

e. If Vbat<Vmin, the human-machine interface (15) requires the connection of the ignition and auxiliary operation device to an external electric power source or the rechargeable electric battery (14), and the electronic device control (7) activates the DC-to-DC converter (4) allowing the external source (14) to charge the ultracapacitor battery (1) up to Vmax.

f. Electrical closing of the starter motor circuit (12).

g. Detection of the electrical closing of the starter motor (1.2) through the measurement of the sudden change in voltage, dVbat, of the electrical system of the internal combustion engine.

h. if dVbat is greater than a predetermined value and the electric starter motor has been electrically closed, the electrical control system (7) closes the second one-way switch (3) allowing the ultracapacitor battery to power the electric circuit of the combustion engine.

i. Detection of the operating status of the internal combustion engine by measuring the voltage, Vbat, of its electrical system.

j. If Vbat=Vmax, the internal combustion engine has started by activating the alternator (11) and electronic control device (7) proceeds to regulate the charge intensity of the battery of ultracapacitors (1) through the pulse width modulation of the first one-way switch (2), k. Stopping the combustion engine.

l. If Vbat is less than or equal to Vnom, the motor is stopped, disengaging the alternator (11) and electronic, control device (7) opens the first (2) and (3) second unidirectional switches and the ultracapacitor battery (1) charges up to Vmax using the DC-to-DC converter (4) with the power supplied by the electric battery of the combustion engine (10) or the external power source (14).

The method according to the invention is noteworthy because, unlike other existing applications based on the use of ultracapacitors, the connection of the device involves a simple operation, without requiring modifications in the wiring of the existing electrical installation, requiring only the parallel connection of the device with the battery or the electrical system by means of "crocodile clips" or another similar connection system. Its operation is automatic and safe. It detects the state of operation of the motor or process, the state of charge of the ultracapacitors and that of the main battery or absence thereof, and protects against erroneous connections and short-circuits to the system and the user.

According to its construction design, the device may be permanently installed or used whenever necessary and may be manufactured to provide any required voltage or different voltages that can be selected manually or automatically.

In order to obtain the maximum torque in the starter motor of the internal combustion engine, the initial charge of the group of ultra-capacitors is carried out at the maximum voltage of the system and can be performed from the partially charged battery or from an auxiliary source if the battery is completely discharged or there is no battery.

The auxiliary power source may have higher or lower voltage than the system's nominal voltage and, in any case, its requirements, in terms of capacity or stored energy, are minimal. For example, the power needed to start the engine of a 2,000 cc diesel can be slightly less than 2 Wh, which can be obtained from a small battery or type AA rechargeable battery. This same amount of energy can be extracted from devices of very varied nature, such as mobile phone batteries, USB ports, solar panels, mains electricity, etc.

In addition to operating in combustion engines the device is also capable of working in hybrid vehicles, aircraft or any device or process that needs a battery to deliver or absorb strong electric currents in a short period of time.

In its portable version, it offers the following advantages compared to a booster:

It contains no liquids.

It has lower weight, and size than a booster.

It does not need to be charged permanently, or previously, meaning that it can be carried in the trunk of the car and used at any time as an emergency device.

A booster does not have automatic management, it only serves to start and does not allow the vehicle to run if the battery is very deteriorated.

This device can be left provisionally installed allowing the ignition and running of the vehicle or motor until the replacement of the damaged electrochemical battery.

In its version for permanent installation offers the following advantages:

Thanks to the automatic management procedure that makes installation possible without needing to modify the electrical wiring of the engine, it avoids other aspects such the need for manufacturer approval, loss of guarantees or the need for factory modifications.

It prevents potential electromechanical failures of the vehicle while running and the potential loss of control of the vehicle caused by a sudden battery failure, thus offering greater safety while on the road.

It significantly increases the life of the electrochemical battery by taking care of the intense discharges and charges that occur during start-up in any combustion engine or braking in hybrid vehicles, for example.

It guarantees ignition at very low temperatures.

It allows the capacity of the conventional battery to be considerably reduced, with the consequent economic and environmental advantages.

The decrease in weight is a notable advantage in certain applications, for example in aircraft.

It is worth mentioning, among all the advantages mentioned, that the device allows the ignition and running of the engine regardless of the status of the electrochemical battery, maintaining the flow of current necessary for the correct operation of electronics, control units, injection systems, ABS by stabilising the constant electrical, thus allowing the vehicle to carry on running without problems until the damaged battery is replaced

The invention claimed is:

1. A device for charging and discharging an ultracapacitor battery without needing external orders, comprising:
    an ultracapacitor battery formed by one or more ultracapacitors,
    a first electrical connection configured in parallel with an electrical system of a combustion engine, the first electrical connection is at-will and removable,
    a second removable electrical connection to an external power source,
    a first one-way switch that controls the flow of electricity from the electrical system of the combustion engine towards the ultracapacitor battery,
    a second one-way switch that controls the flow of electricity from the ultracapacitor battery into the electrical system of the combustion engine, wherein each of the first and the second one-way switches are provided with a diode connected in series,
    a DC-to-DC converter to convert voltage up or down suitable for charging the ultracapacitor battery from the engine's electrical system and from the external power source,
    a first electronic device, the first electronic device prevents the flow of electricity from the external power source into the electrical system of the combustion engine,
    a second electronic device, the second electronic device prevents the flow of electricity from the electrical system of the combustion engine towards the external power source,
    at least one voltage and current sensor configured for measuring the voltage of the electrical system of the internal combustion engine and for measuring intensity of the current flowing between the electrical system of the engine and the ultracapacitor battery arranged in the first electrical connection,
    at least one ultracapacitor battery voltage and current sensor configured for measuring the voltage of the ultracapacitor battery and the current intensity of the ultracapacitor battery,
    an ambient temperature sensor,
    a device to select the maximum ultracapacitor charging voltage,
    a human-machine interface configured for:
        communicating with the electronic control device and allowing the programming of parameters nominal voltage (Vnom), maximum voltage (Vmax), minimum voltage (Vmin), and change in voltage (dVbat), and
        displaying information on the operating parameters of the ignition and auxiliary power devices of the electrical system of the internal combustion engine and for operating said ignition and auxiliary power device, and
    an electronic control device and its corresponding firmware configured for:
        receiving and processing the signals measured by the at least one voltage and current sensor and the at least one ultracapacitor battery voltage and current sensor of the electrical system of the combustion engine and the ultracapacitors, receiving and processing the signal captured by the ambient temperature sensor, for the modification of the parameters nominal voltage (Vnom), maximum voltage (Vmax), minimum voltage (Vmin) and change in voltage (dVbat) according to the ambient temperature and the characteristics of the electric battery of the combustion engine, controlling the opening and closing of the first and second one-way switches, controlling the pulse width of the second one-way switch, and controlling the operation of the DC-to-DC converter and communicating with the human-machine interface, wherein the device is used to support a device or process requiring an electrochemical battery to deliver or absorb electrical currents in a period of time.

2. The device for managing the charging and discharging of an ultracapacitor battery without needing external orders according to claim 1, wherein the first and second electronic devices are diodes.

3. The device for managing the charging and discharging of an ultracapacitor battery without needing external orders according to claim 1, further comprising an AC-to-DC converter connected between the second removable electrical connection and the DC-to-DC converter.

4. The device for managing the charging and discharging of an ultracapacitor battery without needing external orders according to claim 1, wherein the external power source is a rechargeable electric battery for charging the ultracapacitor battery.

5. The device for managing the charging and discharging of an ultracapacitor battery without needing external orders according to claim 1, wherein the human-machine interface is a remote device.

6. The device for managing the charging and discharging of an ultracapacitor battery without needing external orders according to claim 1, wherein the device for managing the charging and discharging of an ultracapacitor battery is electrically connected to an electrochemical battery forming a power supply device assembly.

7. A management process for charging and discharging an ultracapacitor battery without external orders using a device for charging and discharging an ultracapacitor battery without needing external orders, comprising:
   an ultracapacitor battery formed by one or more ultracapacitors,
   a first electrical connection configured in parallel with an electrical system of a combustion engine, the first electrical connection is at-will and removable,
   a second removable electrical connection to an external power source,
   a first one-way switch that controls the flow of electricity from the electrical system of the combustion engine towards the ultracapacitor battery,
   a second one-way switch that controls the flow of electricity from the ultracapacitor battery into the electrical system of the combustion engine, wherein each of the first and the second one-way switches are provided with a diode connected in series,
   a DC-to-DC converter to convert voltage up or down suitable for charging the ultracapacitor battery from the engine's electrical system and from the external power source,
   a first electronic device, the first electronic device prevents the flow of electricity from the external power source into the electrical system of the combustion engine,
   a second electronic device, the second electronic device prevents the flow of electricity from the electrical system of the combustion engine towards the external power source,
   at least one voltage and current sensor configured for measuring the voltage of the electrical system of the internal combustion engine and for measuring intensity of the current flowing between the electrical system of the engine and the ultracapacitor battery arranged in the first electrical connection,
   at least one ultracapacitor battery voltage and current sensor configured for measuring the voltage of the ultracapacitor battery and the current intensity of the ultracapacitor battery,
   an ambient temperature sensor,
   a device to select the maximum ultracapacitor charging voltage,
   a human-machine interface configured to:
      communicating with the electronic control device and allowing the programming of parameters nominal voltage (Vnom), maximum voltage (Vmax), minimum voltage (Vmin), and change in voltage (dVbat), and
      displaying information on the operating parameters of the ignition and auxiliary power devices of the electrical system of the internal combustion engine and for operating said ignition and auxiliary power device, and
   an electronic control device and its corresponding firmware configured to:
      receiving and processing the signals measured by the at least one voltage and current sensor and the at least one ultracapacitor battery voltage and current sensor of the electrical system of the combustion engine and the ultracapacitors, receiving and processing the signal captured by the ambient temperature sensor, for the modification of the parameters nominal voltage (Vnom), maximum voltage (Vmax), minimum voltage (Vmin) and change in voltage (dVbat) according to the ambient temperature and the characteristics of the electric battery of the combustion engine, controlling the opening and closing of the first and second one-way switches, controlling the pulse width of the second one-way switch, and
      controlling the operation of the DC-to-DC converter and communicating with the human-machine interface,
   the process comprising the steps:
      a. connecting in parallel to the electrical system of a combustion engine,
      b. selecting the maximum voltage (Vmax) and the nominal voltage (Vnom) of the electrical system of the combustion engine,
      c. detecting a voltage of the battery (Vbat) of the combustion engine,
      d. if voltage of the battery (Vbat) is greater than the minimum voltage (Vmin), the electronic control device activates the DC-to-DC converter allowing the electric battery of the engine to charge the ultracapacitor battery up to Vmax,
      e. if voltage of the battery (Vbat) is less than the minimum voltage (Vmin), the human-machine interface activates the connection of the ignition and auxiliary operation device to an external electric power source or the rechargeable electric battery, and the electronic device control activates the DC-to-DC converter allowing the external source or the rechargeable electric battery to charge the ultracapacitor battery up to the maximum voltage (Vmax),
      f. electrical closing of a starter motor circuit, g. detecting of an electrical closing of a electrical starter motor by the starter motor circuit through the measurement of the change in voltage, (dVbat), of the electrical system of the combustion engine,
h. if the change in voltage (dVbat) is greater than a predetermined value and the electric starter motor has been electrically closed, the ultracapacitor battery powers the electric circuit of the combustion engine,
i. detecting the operating status of the combustion engine by measuring the voltage of the battery (Vbat) of its electrical system,
j. if the voltage of the battery (Vbat) is equal to the maximum voltage (Vmax), the internal combustion engine has started and has activated a charging alternator, electronic control device regulates the charging intensity of the battery of ultracapacitors through the pulse width modulation of the first one-way switch,
k. stopping the combustion engine,
l. if the voltage of the battery (Vbat) is less than or equal to the nominal voltage (Vnom), the motor is stopped, disengaging the charging alternator and electronic control device opens the first and second unidirectional switches and the ultracapacitor battery charges up to the maximum voltage (Vmax) using the DC-to-DC converter with the power supplied by the electric battery of the combustion engine or the external power source.

\* \* \* \* \*